T. W. KIENAST.
SURFACE COATING MECHANISM.
APPLICATION FILED MAY 17, 1907.
933,375.
Patented Sept. 7, 1909.
3 SHEETS—SHEET 1.
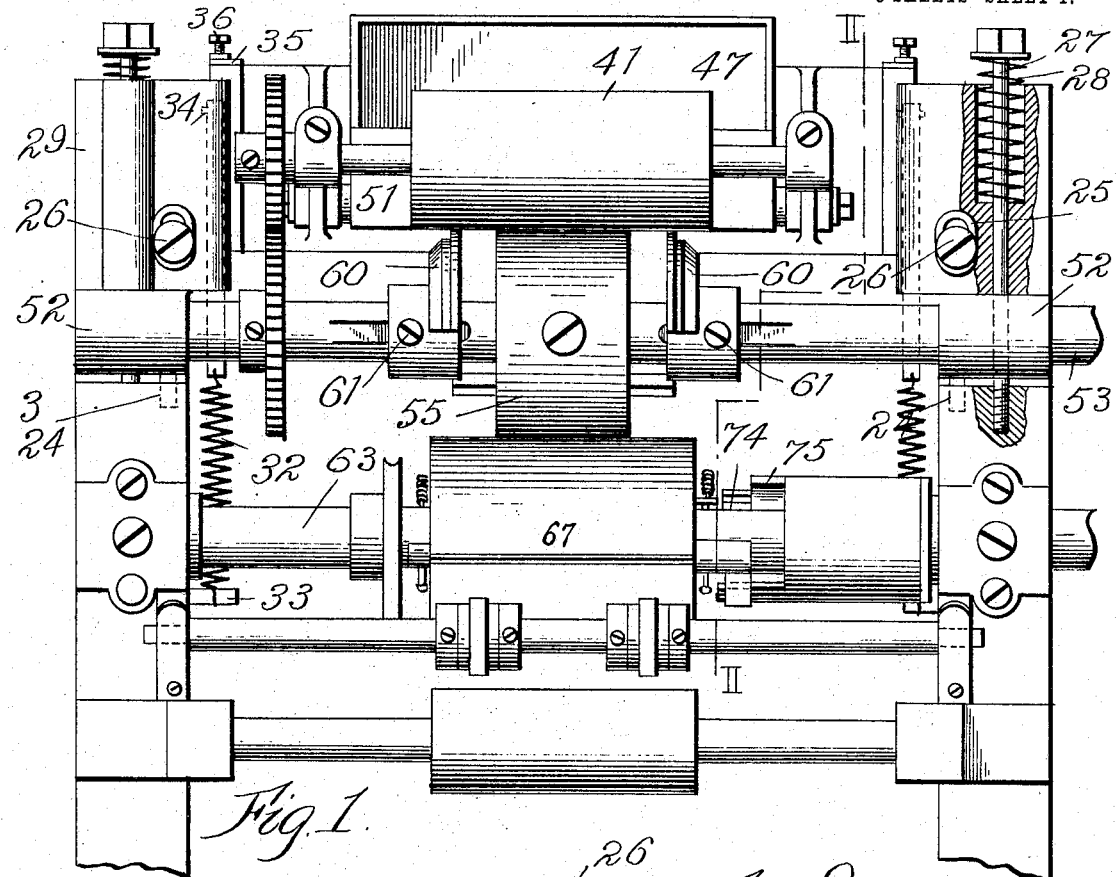
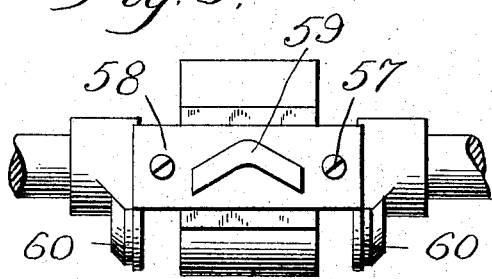
Witnesses:
O. Knight
H. A. Jauke
Inventor
T. William Kienast
By his Attorneys T. W. KIENAST.
SURFACE COATING MECHANISM.
APPLICATION FILED MAY 17, 1907.
933,375.
Patented Sept. 7, 1909.
3 SHEETS—SHEET 2.
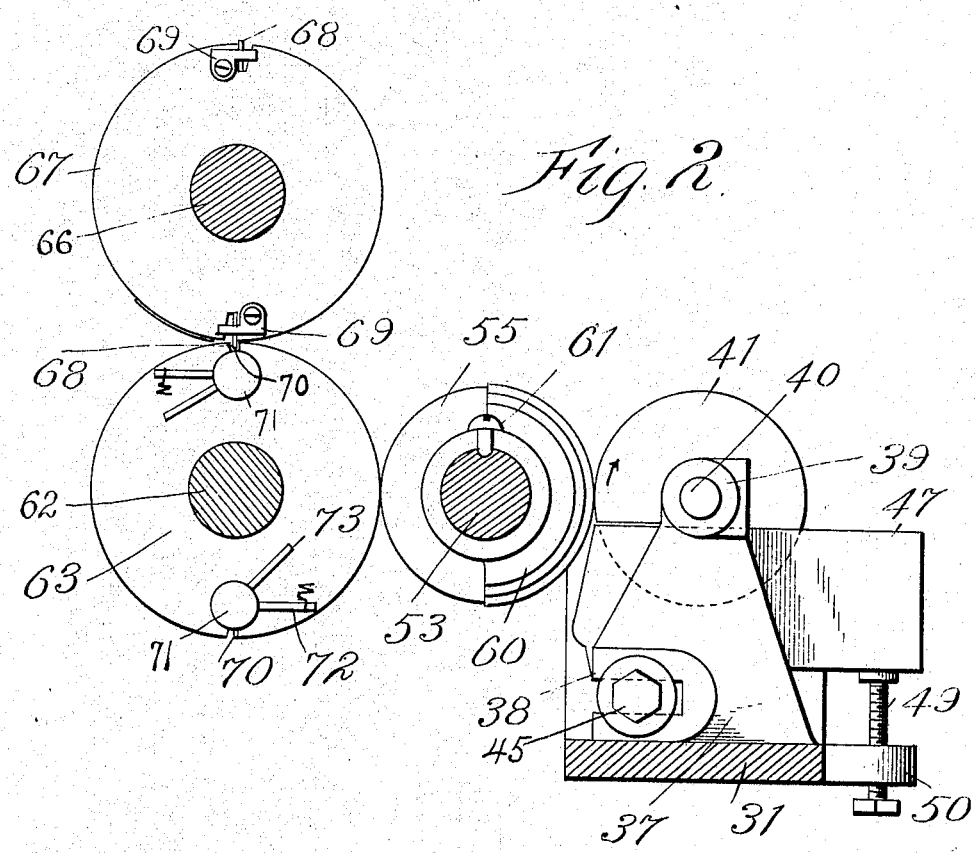
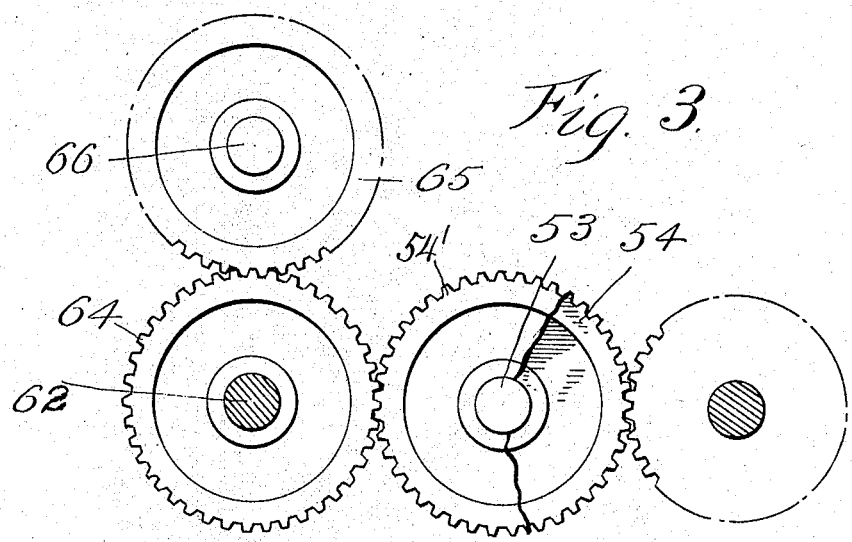
Witnesses:
O. Knight Jr.
H. A. Jauke
Inventor
T. William Kienast
By his Attorneys

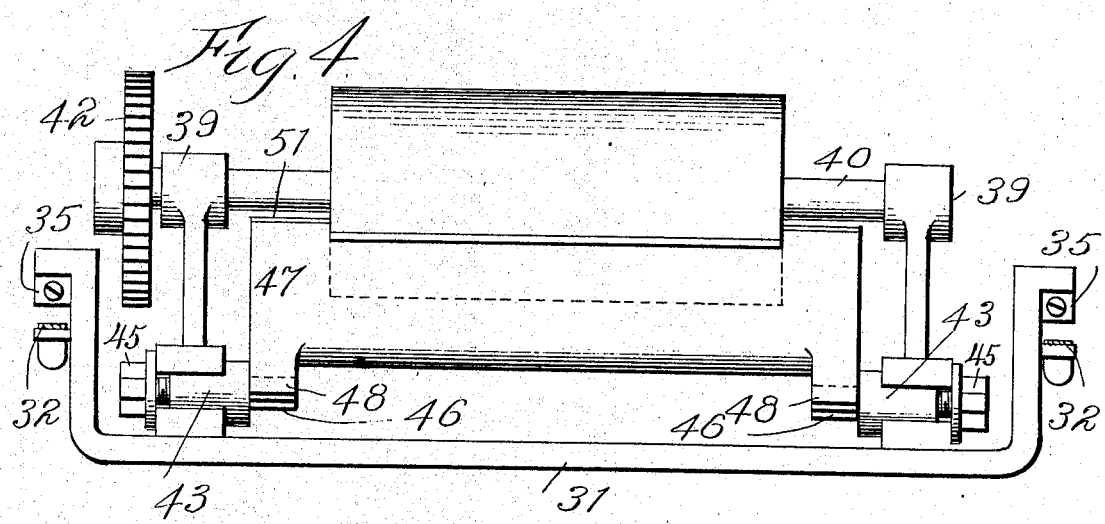
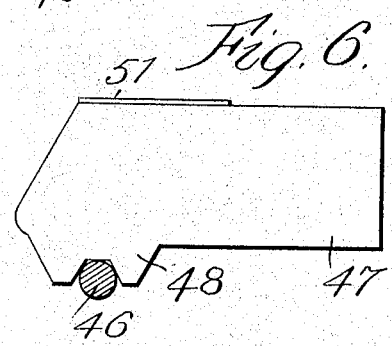
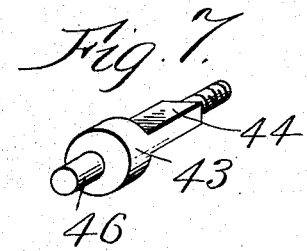
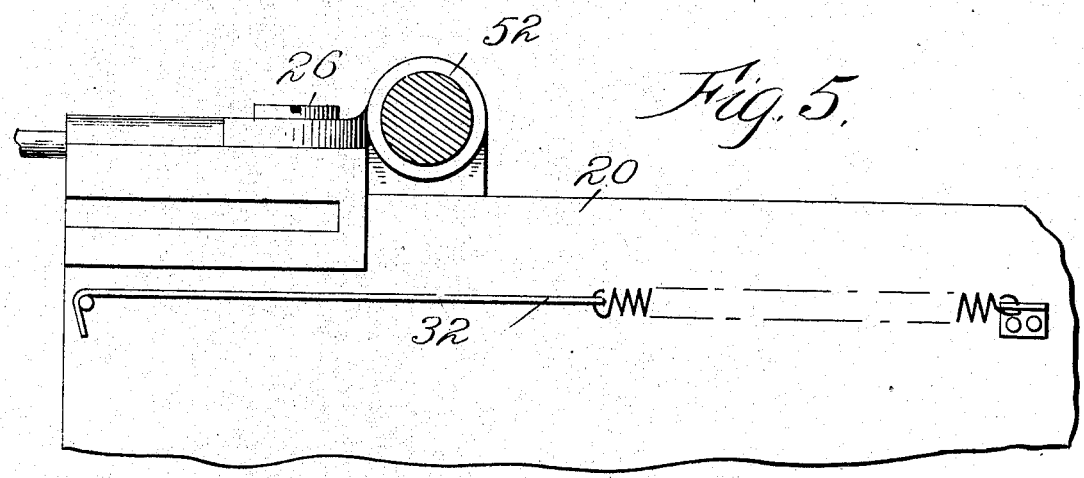

UNITED STATES PATENT OFFICE.

T. WILLIAM KIENAST, OF NEW YORK, N. Y., ASSIGNOR TO SAMUEL CUPPLES ENVELOPE COMPANY, OF NEW YORK, N. Y., A CORPORATION OF MISSOURI.

SURFACE-COATING MECHANISM.

933,375.  Specification of Letters Patent.  Patented Sept. 7, 1909.

Original application filed February 19, 1907, Serial No. 358,202. Divided and this application filed May 17, 1907. Serial No. 374,270.

*To all whom it may concern:*

Be it known that I, T. WILLIAM KIENAST, a citizen of the United States, residing in the borough of Manhattan, in the city and State of New York, have invented certain new and useful Improvements in Surface-Coating Mechanisms, of which the following is a specification.

My present application is divided from my original application entitled "Envelop machine", which was filed on February 19th, 1907, and serially numbered 358202.

My application relates to surface coating mechanisms, and in order to clearly illustrate the invention, I shall describe the same with reference to mechanism for coating the surfaces of envelop blanks.

The principal features of novelty in my invention relate to the means for applying the gum, the means for distributing the gum and the adjustability of the various elements of the combination. These and other features of novelty will be readily understood from the description of the invention with reference to the accompanying drawings.

In the drawings, Figure 1 is a top plan view of the complete surface coating mechanism, Fig. 2 is a transverse section of the same on line H—H of Fig 1, Fig. 3 is a side elevation showing the means for driving the elements of the mechanism, Fig. 4 is a detail elevation of the gum trough and distributing roller shown mounted in the U-shaped bracket, Fig. 5 is a side elevation showing the sliding frame mounted on the stationary frame and bearing the track for the reception of the U-shaped bracket, Fig. 6 is a side elevation showing the gum trough seated on the trunnion bearings, Fig. 7 is a detail perspective view of the trunnion bearing, Fig. 8 is a detail elevation showing the mounting of the sliding frame on the stationary frame and the U-shaped bracket in the sliding frame, Fig. 9 is a detail view showing the gum applying means, and Fig. 10 is a transverse section of the gum applying means.

Referring now more specifically to the drawings, 20 indicates the stationary frame of a machine which may for example be considered an envelop machine. The stationary frame 20 has a flange 21 with a grooved upper surface. The sliding frame is indicated at 22 and has an underneath flange 23 which fits within the groove in the upper portion of the flange 21 so as to permit movement of the sliding frame 22 upon the stationary frame 20. A guide pin 24 projecting forward from sliding frame 22 engages in a recess in the stationary frame 20 to guide the sliding frame during its motion upon the stationary frame. The sliding frame also has a slot 25 through which a retaining screw 26 passes. The retaining screw 26 is seated in the stationary frame 20, as clearly shown in Fig. 8. In order to resiliently draw the sliding frame 22 toward the forward end of its path for a purpose which will hereinafter appear, a bolt 27 passes loosely through the sliding frame 22 and is seated at its forward end in the stationary frame 20. A spring 28 is confined by the head of the bolt 27 within a suitable spring recess which is formed in the sliding frame 22, as clearly shown in Fig. 1. The above-described retaining screw 26 serves the purpose of preventing excessive rearward movement of the sliding frame 22 against the opposition of the spring 28.

The sliding frame 22 has a downwardly extending flange 29 clearly shown in Fig. 8. This flange 29 has a grooved inner surface. This groove receives the outwardly projecting flange 30 of the U-shaped bracket 31 so as to permit forward and rearward movement of said U-shaped bracket relatively to the sliding frame 22. In order to resiliently draw the U-shaped bracket 31 toward the forward end of its path in the sliding frame 22, for a purpose which will hereinafter appear, a spring device 32 fixed at its forward end to a lug 33 on the stationary frame 20 and at its rearward end to a pin 34 on U-shaped bracket 31 is provided. This construction is clearly shown in Figs. 1 and 5 of the drawings. In order to adjustably limit the forward movement of the U-shaped bracket 31, a flange 35 is formed at the rearward end of the flange 30 and is adapted to receive an adjustable stop pin 36 which abuts against the rearward end of the flange 29 of the sliding frame 22. The gum trough and distributing roller are mounted upon the said U-shaped bracket 31 as clearly shown in Figs. 2 and 4. It will be seen that the U-shaped bracket 31 has a pair of upright supports 31 which have slotted portions 38 near the bottom which are provided with journal bearings 39 at the top. The journal bearings 39 receive the shaft 40 which carries the gum distributing roller 41. On one end of the shaft 40 is a gear wheel 42 which is driven in the manner hereinafter to be described. Each of the slotted portions 38 above referred to receives a stationary trunnion 43 (shown in detail in Fig. 7), which has a cut-away portion 44 to allow it to enter the slot and a nut 45 (see Fig. 4) threaded on the end thereof to secure it in place. The circular end 46 projects inwardly and upon this rests the forward end of the gum trough 47, (see Figs. 4 and 6). The gum trough 47 does not rest directly upon the stationary trunnions, but is provided with lugs 48 which, as clearly shown in Fig. 6, have angular recesses and fit over the round portion 46 of the trunnions, their angular shape preventing binding. The trunnions 43 are adjustably secured in the slotted portions 38 so that the gum trough may be adjusted forwardly or rearwardly to any desired position and thus the trough moved bodily relatively to the gum distributing roller.

The rear end of the gum trough 47 rests upon supporting bolt 49 which is adjustably secured in the lip 50 projecting from the bottom of the U-shaped bracket 31 and thus permits tilting the gum trough to any desired position relatively to the gum distributing roller 41. The gum trough can thus be set at any desired position relatively to the gum distributing roller 41. Scraping plates 51 are provided on the gum trough to scrape the ends of the gum distributing roller 41 to keep them suitably free of gum.

Referring again to the sliding frame 22, it will be seen that it is provided at its forward end with a journal bearing 52 (see Figs. 1 and 5). This journal bearing 52 receives a shaft 53 which has fixed on one end a gear wheel 54 in mesh with the above mentioned gear wheel 42 and on the other end a gear wheel 54'. The shaft 53 has mounted on it the gum applying means, which will now be described. This means is illustrated in Figs. 1, 2, 9 and 10. In the machine which I have shown to illustrate my improved surface coating mechanism the object is to gum the laps and flaps of envelops. To carry out this purpose the gum applying means comprises the following elements:

A central roller 55 is adjustably fixed to the shaft 53, as clearly shown in Fig. 10 by a countersunk set screw 55'. The central roller 55 has a flattened side, upon which is mounted a plate 56. The plate 56 has resiliently secured to it by means of retaining screws 57, a gum die plate 58 which bears the gum die 59 for gumming the flaps of the envelops in the particular machine described as an example of my invention. Any suitable resilient device, such as a spring, may be interposed between the plate 56 and the gum die plate 58, and the location of the roller is such that in rotation the gum die 59 comes into contact with the face of the gum distributing roller 41 and thus has the gum deposited upon it, while no other part of the central roller comes into engagement with the gum distributing roller 41. It is obvious that by the above-described construction the die plate is readily removable and may be substituted by other suitable plates to suit the particular need. The position of the central roller 55 being variable by means of its set screws fastened to the shaft 53, may also be adjusted to any desired position.

The lap gumming members are in the form of segment rollers 60 which are keyed on to slotted portions of the shaft 53 by the set screws 61 (see Figs. 1 and 2). It is thus evident that the lap gumming segment rollers 60 are readily adjustable on the shaft 53 to suit different widths of envelops. The segment rollers are so constructed that during rotation they come into contact with the gum distributing roller 41 for a predetermined portion of each revolution. This construction does away with the necessity of providing a shifting means for the shaft 53, which has heretofore been commonly employed to obtain contact for a fraction of one revolution.

I have shown in the drawings a roller which serves the purpose of carrying the envelop blanks past the gumming device. The roller which performs this function however, is constructed with certain specific details which apply more properly to the blank forming mechanism which is not concerned in the present division of my original application above referred to. This carrying means however, may be briefly described with reference to Figs. 1 and 2 in which 62 indicates the shaft carrying the bottom roll 63. The shaft 62 is mounted in the stationary frame 23 and has on its end the gear wheel 64 (see Fig. 3) which meshes with the above-described gear wheel 54'. The shaft 63 is the driving shaft in the machine and it will thus be seen that through the gear wheels 54 and 42 the shafts 53 and 40 receive their motion above referred to. The gear wheel 64 also meshes with a gear wheel 65 which is keyed to a shaft 66 directly above the shaft 63, and which carries the top roll 67 shown in Figs. 1 and 2. The shaft 67 has a pair of scoring bars 68. Scoring bars 68 are positioned in grooves formed in the upper roll 67 and suitably held by retaining lugs 69. The specific construction of these elements has been clearly described in my original application and need not be gone into here further than to show the general principle. As is well known these scoring bars are resiliently held in one side of their grooves by suitable spring devices and are intended to coöperate with a pair of gripping bars 70 carried by the bottom roll 63. The gripping bars 70 are mounted in rocking supports 71 which are spring returned by the arm 72 and operated through the arm 73 by means of suitable cams 74 and 75 shown in Fig. 1, all of which is constructed as fully described in my above mentioned original application.

The operation of the scoring bars 68 and gripping bars is to enable the latter to grip the envelop blank and carry it past the gum applying means carried by shaft 53. In this operation the flap of the envelop rotates in engagement with the flap gumming die 59 and the laps of the envelop rotate in engagement with the segment rollers 60. The envelop blank is thus prepared for folding, the gumming having been accomplished in a single operation.

I claim:

1. The combination with a gum applying roller and a trough; of a gum distributing roller adapted to rotate in said trough and transfer gum therefrom to said gum applying roller, means controlled by the operator for setting and maintaining said trough throughout the operation of the machine at any desired tilt relatively to said gum distributing roller, and means for moving said gum distributing roller and gum trough in unison toward and away from said gum applying roller.

2. The combination with a gum applying roller and a gum trough; of a gum distributing roller adapted to rotate in said trough and transfer gum therefrom to said gum applying roller, means for tilting said trough relatively to said gum distributing roller and bringing a scraping front portion of it into operative relation with said gum distributing roller, and means for moving said gum distributing roller and gum trough in unison toward and away from said gum applying roller.

3. The combination with a gum applying roller and a gum trough; of a gum distributing roller adapted to rotate in said gum trough and transfer gum therefrom to said gum applying roller, means for bodily moving said gum trough relatively to said gum distributing roller and bringing a scraping front portion of it into operative relation with said gum distributing roller, and means for moving said gum distributing roller and gum trough in unison toward and away from said gum applying roller.

4. The combination with a gum applying roller and a gum trough; of a gum distributing roller adapted to rotate in said gum trough and transfer gum therefrom to said gum applying roller, means for bodily moving and tilting said gum trough relatively to said gum distributing roller and bringing a scraping front portion of it into operative relation with said gum distributing roller, and means for moving said gum distributing roller and gum trough in unison toward and away from said gum applying roller.

5. The combination with a bracket, and a gum trough secured therein; of a gum distributing roller journaled in said bracket and rotating in said gum trough, and means for bodily moving said trough independently of said roller into an adjusted position and maintaining the same in such position throughout the operation of the machine.

6. The combination with a bracket, and a gum trough secured therein, of a gum distributing roller journaled in said bracket and rotating in said gum trough, and means for tilting and bodily moving said trough independently of said roller into an adjusted position and maintaining the same in such position throughout the operation of the machine.

7. The combination with a bracket, and a gum trough secured therein; of a gum distributing roller journaled in said bracket and rotating in said gum trough, means for moving said trough and roller in unison, and means for varying the position of said roller with respect to said trough into an adjusted position and maintaining the same in such position throughout the operation of the machine.

8. The combination with a bracket, and a gum trough secured therein, of a gum distributing roller journaled in said bracket and rotating in said gum trough, means for moving said trough and roller in unison, and means for adjusting said trough independently of said roller and maintaining said trough in such adjusted position throughout the operation of the machine.

9. The combination with a bracket, and a gum trough secured therein; of a gum distributing roller journaled in said bracket and rotating in said trough, means for moving said trough and roller in unison, and means for tilting said trough independently of said roller.

10. The combination with a bracket, and a gum trough secured therein; of a gum distributing roller journaled in said bracket and rotating in said trough, means for moving said trough and roller in unison in the machine, and means for bodily moving said trough independently of said roller into an adjusted position and maintaining the same in such adjusted position throughout the operation of the machine.

11. The combination with a bracket, and a gum trough secured therein; of a gum distributing roller journaled in said bracket and rotating in said trough, means for moving said trough and roller in unison, and means for tilting and bodily moving said trough independently of said roller.

12. The combination with a gum trough, and a gum distributing roller rotating therein; of a fulcrum horizontally adjustable for one end of said receptacle and a vertically adjustable support for the other end of said receptacle.

13. The combination with gum applying means, a bracket, and automatic means for adjusting the position of said bracket with respect to said gum applying means; of a gum trough supported by said bracket, a gum distributing roller rotating in said trough and in contact with said gum applying means, and means for tilting said trough independently of said gum distributing roller.

14. The combination with gum applying means, a bracket, and automatic means for adjusting the position of said bracket with respect to said gum applying means; of a gum trough supported by said bracket, a gum distributing roller rotating in said trough and in contact with said gum applying means, and means for tilting and bodily moving said gum trough independently of said gum distributing roller.

15. The combination with a frame, and gum applying means journaled therein; of a bracket slidably mounted in said frame, automatic means for sliding said bracket in said frame, a gum trough supported by said bracket, and a gum distributing roller journaled in said bracket and rotating in the trough in contact with said gum applying means.

16. The combination with a frame, and gum applying means journaled therein, of a bracket slidably positioned in said frame, automatic means for sliding said bracket in said frame, a gum trough supported by said bracket, a gum distributing roller journaled in said bracket and rotating in said trough in contact with said gum applying means, and means for adjusting the position of said trough in said bracket.

17. The combination with a roller adapted to carry the blank to be coated, a gum trough, and a gum distributing roller receiving gum from said trough; of a rotating shaft, a pair of segment disks adjustably secured thereon, and a resilient gum die carried by said shaft; said segment disks and resilient gum die rotating in contact with said gum distributing roller and transferring gum therefrom to the blank.

18. The combination with a roller adapted to carry a blank to be coated, a gum trough, and a gum distributing roller rotating in said trough, of a gum applying means rotating in contact with said gum distributing roller and adapted to transfer gum from said distributing roller to the blank to be coated; said gum applying means being resiliently mounted with respect to said carrying roller, and said gum distributing roller being resiliently mounted with respect to said gum applying means.

19. The combination with a roller adapted to carry a blank to be coated; of a rotating shaft resiliently mounted with respect to said roller, a pair of adjustably mounted segment plates carried by said shaft, and a resiliently mounted gum die mounted on said shaft; said segment plates and die receiving gum from a suitable supplying means and delivering it to the blank.

20. The combination with a bracket, a pair of journal bearing arms mounted in said bracket, and a gum distributing roller journaled in said arms, of a pair of trunnions carried by said arms, a gum trough supported at one end by said trunnions, and an adjustable support for its other end mounted in the bracket and adapted to maintain said trough at any desired tilt throughout the operation of the machine.

21. The combination with a stationary frame, a sliding frame mounted in said stationary frame, and a sliding bracket mounted in said sliding frame; of a roller journaled in said stationary frame and adapted to carry a blank to be coated, a gum distributing roller mounted in said sliding bracket, and a gum applying means mounted in said sliding frame, and transferring gum from said gum distributing roller to the blank to be coated.

22. The combination with a stationary frame, a sliding frame mounted in said stationary frame, a sliding bracket mounted in said sliding frame, automatic means for adjusting the position of said sliding frame in said stationary frame, and automatic means for adjusting the position of said sliding bracket in said sliding frame; of a roller journaled in said stationary frame and adapted to carry a blank to be coated, a gum distributing roller carried by said sliding bracket, and gum applying means carried by said sliding frame and transferring gum from said distributing roller to the blank.

23. The combination with a stationary frame, a sliding frame mounted in said stationary frame, a sliding bracket mounted in said sliding frame, a spring attached at one end to said stationary frame and at its other end to said sliding frame, and a spring attached at one end to said stationary frame and at its other end to said sliding bracket; of a roller journaled in said stationary frame and adapted to carry a blank to be coated, a gum trough adjustably positioned in said sliding bracket, a gum distributing roller journaled in said sliding bracket and rotating in said gum trough, and a gum applying means carried by said sliding means and transferring gum from said gum distributing roller to the blank to be coated.

24. The combination with a gum supplying means; of a gum applying means comprising a rotary shaft; a pair of segmental gum applying disks; means for adjustably positioning said segmental disks upon said shaft and a gum applying die on said shaft between said segmental disks and resiliently mounted with respect to said shaft.

25. The combination with a gum supplying means; of a gum applying means comprising a rotary shaft, a pair of segmental gum applying disks thereon, a gum applying die and means for adjustably and resiliently securing said gum applying die on said rotary shaft between said segmental gum applying disks.

T. WILLIAM KIENAST.

Witnesses:
 HARRY E. KNIGHT,
 OCTAVIUS KNIGHT, Jr.